(12) United States Patent
Luttrell et al.

(10) Patent No.: US 10,516,816 B2
(45) Date of Patent: Dec. 24, 2019

(54) ENHANCED INFORMATION HANDLING DEVICE COVER

(71) Applicant: Lenovo (Singapore) Pte. Ltd., Singapore (SG)

(72) Inventors: Wesley Abram Luttrell, Raleigh, NC (US); Christopher Miles Osborne, Cary, NC (US); Daniel Jordan Schantz, Raleigh, NC (US); Vincent Charles Conzola, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/547,734

(22) Filed: Nov. 19, 2014

(65) Prior Publication Data
US 2016/0142594 A1 May 19, 2016

(51) Int. Cl.
*H04N 5/232* (2006.01)
*H04N 5/225* (2006.01)
*A45C 11/38* (2006.01)

(52) U.S. Cl.
CPC ......... *H04N 5/23203* (2013.01); *A45C 11/38* (2013.01); *H04N 5/2252* (2013.01); *H04N 5/232* (2013.01)

(58) Field of Classification Search
CPC .... G03B 17/56; G03B 17/561; G03B 17/566; G03B 17/568; G03B 2215/0514; G03B 2215/0517; G03B 2215/0521; H04N 5/23203; H04N 5/23216; H04N 5/23293; H04N 1/00129; H04N 5/2251–5/2252; H04N 5/23209; H04N 5/2258; H04M 1/72527; A45C 11/38; A45C 2011/001–003
See application file for complete search history.

(56) References Cited

U.S. PATENT DOCUMENTS

| | | | |
|---|---|---|---|
| 5,159,375 A * | 10/1992 | Taniguchi | G03B 7/091 396/56 |
| 6,138,826 A * | 10/2000 | Kanamori | A45C 11/38 206/316.2 |
| 8,363,157 B1 * | 1/2013 | Han | H04N 5/2256 348/370 |
| 9,185,275 B2 * | 11/2015 | Osborne | H04N 5/2252 |
| 2005/0280732 A1 * | 12/2005 | Misawa | H04N 5/2251 348/333.06 |
| 2005/0285963 A1 * | 12/2005 | Misawa | H04N 5/23293 348/333.06 |
| 2012/0140085 A1 * | 6/2012 | Gallinat | H04N 5/225 348/207.1 |

(Continued)

FOREIGN PATENT DOCUMENTS

JP 05-061109 * 3/1993

*Primary Examiner* — Paul M Berardesca
(74) *Attorney, Agent, or Firm* — Ference & Associates LLC

(57) ABSTRACT

One embodiment provides a system, including: an information handling device comprising a camera; and a cover for the information handling device, comprising: a movable area obscuring and exposing the camera; at least one button controlling activation of the camera; and a communication mechanism facilitating communication between the cover and the information handling device. Other aspects are described and claimed.

20 Claims, 6 Drawing Sheets

(56) References Cited

U.S. PATENT DOCUMENTS

| | | | | |
|---|---|---|---|---|
| 2012/0262617 A1* | 10/2012 | Cheng | ............... | H04N 5/23293 348/333.01 |
| 2014/0166658 A1 | 6/2014 | Hamra | ..................... | A45F 5/00 220/500 |
| 2014/0347555 A1* | 11/2014 | Hirakata | ................ | G03B 15/03 348/371 |
| 2014/0359438 A1* | 12/2014 | Matsuki | .................. | G02B 7/36 715/702 |
| 2015/0049204 A1* | 2/2015 | Okabe | .................. | G03B 17/12 348/207.1 |
| 2015/0116576 A1* | 4/2015 | Grandin | ................ | G02B 1/113 348/342 |
| 2015/0350551 A1* | 12/2015 | Harris | ............... | H04N 5/23216 348/231.99 |
| 2015/0378592 A1* | 12/2015 | Kim | ..................... | G06F 1/1626 715/765 |
| 2017/0310888 A1* | 10/2017 | Wright | .................. | H04N 5/772 |

* cited by examiner

ENHANCED INFORMATION HANDLING DEVICE COVER

BACKGROUND

Portable information handling devices (e.g., tablets, smart phones, eReaders, gaming devices, etc.) are increasing in functionality, allowing users to perform more and more tasks using the information handling device. For example, a user may use a handheld gaming device to take pictures. A user may also want to protect the portable information handling device with a cover or protector of some type.

BRIEF SUMMARY

In summary, one aspect provides a system, comprising: an information handling device comprising a camera; and a cover for the information handling device, comprising: a movable area obscuring and exposing the camera; at least one button controlling activation of the camera; and a communication mechanism facilitating communication between the cover and the information handling device.

Another aspect provides a method, comprising: receiving, through a communication mechanism operatively coupled to a cover for an information handling device, a user input comprising exposing a camera integral to the information handling device, wherein the exposing comprises the user operating a movable area of the cover; activating, using a processor, the camera after the exposing; and receiving, using a processor, the image captured by the camera.

A further aspect provides a device, comprising: a processor; a communication mechanism operatively coupled to the processor; a camera operatively coupled to the processor; a memory device that stores instructions executable by the processor to: receive, through the communication mechanism, a user input comprising exposing the camera; activate the camera after the exposing; and receive the image captured by the camera.

A further aspect provides a cover, comprising: a movable area obscuring and exposing a camera of an information handling device; at least one button controlling activation of the camera of the information handling device; and a communication mechanism facilitating communication between the cover and the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
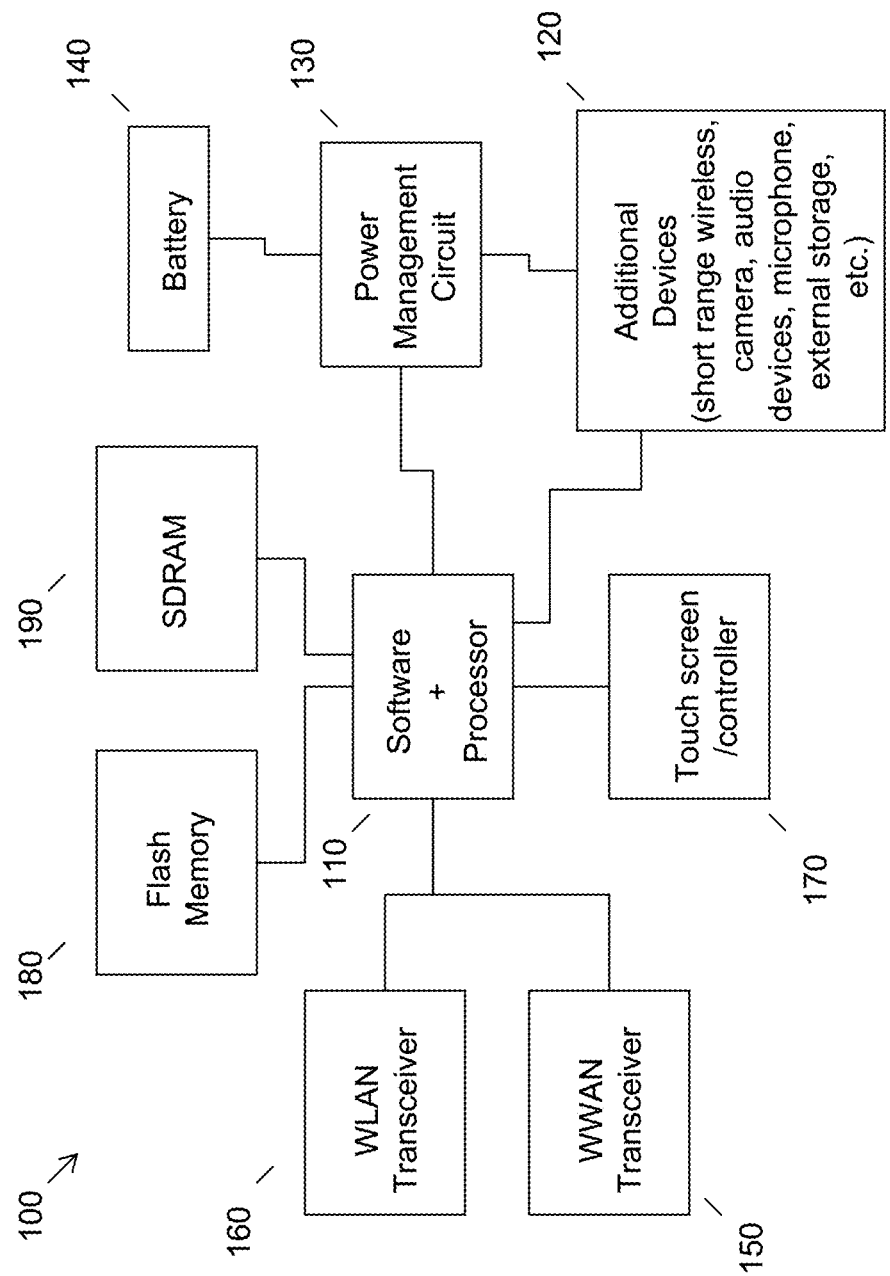
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With the increase in portability and functionality of information handling devices ("devices"), users are using their portable information handling devices (e.g., smart phone, tablet, eReader, handheld gaming device, etc.) to perform additional functions, for example, taking pictures with an onboard camera. Since users may carry these devices with them to many locations, some users also like to protect the device with a protector or cover of some type. In order to preserve the functionality of the information handling device, for example, access to buttons or switches, access to the onboard camera, no decrease in sound, and the like, the cover may include openings or slots to allow the user access to the buttons or features of the device. For example, a cover for a smart phone may include a hole in the location where the camera is located.

Some manufacturers of covers are now including functionality in the cover to allow for an enhanced user experience. For example, the LENOVO Quick Shot Cover allows a user to fold down a flap covering a device's camera. The uncovering of the camera then launches the camera interface. However, the cover does not allow the user to perform any additional actions. The user still has to interact with the camera interface on the device to modify the frame or take the picture. This fumbling with a camera interface which the user may not be familiar with may cause the person to miss the ideal picture. Additionally, some information handling devices use different hardware buttons (e.g., volume, select, menu, etc.) to control the functionality of the camera. The user may have to learn which buttons cause different actions of the camera which can be confusing and time consuming. LENOVO is a registered trademark of Lenovo (Beijing) Limited in the United States and other countries.

Accordingly, an embodiment provides a device which has a shutter button integrated into the cover. The cover includes electrical connections which allow the cover to communicate with the device to manipulate the camera software. An embodiment allows a person to expose the camera and press a button located on the cover to take a picture.

In one embodiment, the cover includes additional functionality which allows the user to perform additional actions using just the cover. For example, one embodiment includes a zoom mechanism allowing the user to zoom in or out using just the mechanism on the cover. As another example, an embodiment includes a toggle which the user may use to switch the camera functionality between capture modes, for example, picture capture mode, video capture mode, and the like. In one embodiment, if a user holds a button located on the cover, the camera may enter a different shooting mode, for example, rapid shot mode, video capture mode, high-dynamic range mode. Embodiments may also provide other increased functionality, for example, a secondary flash, user configurable functions, and the like.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
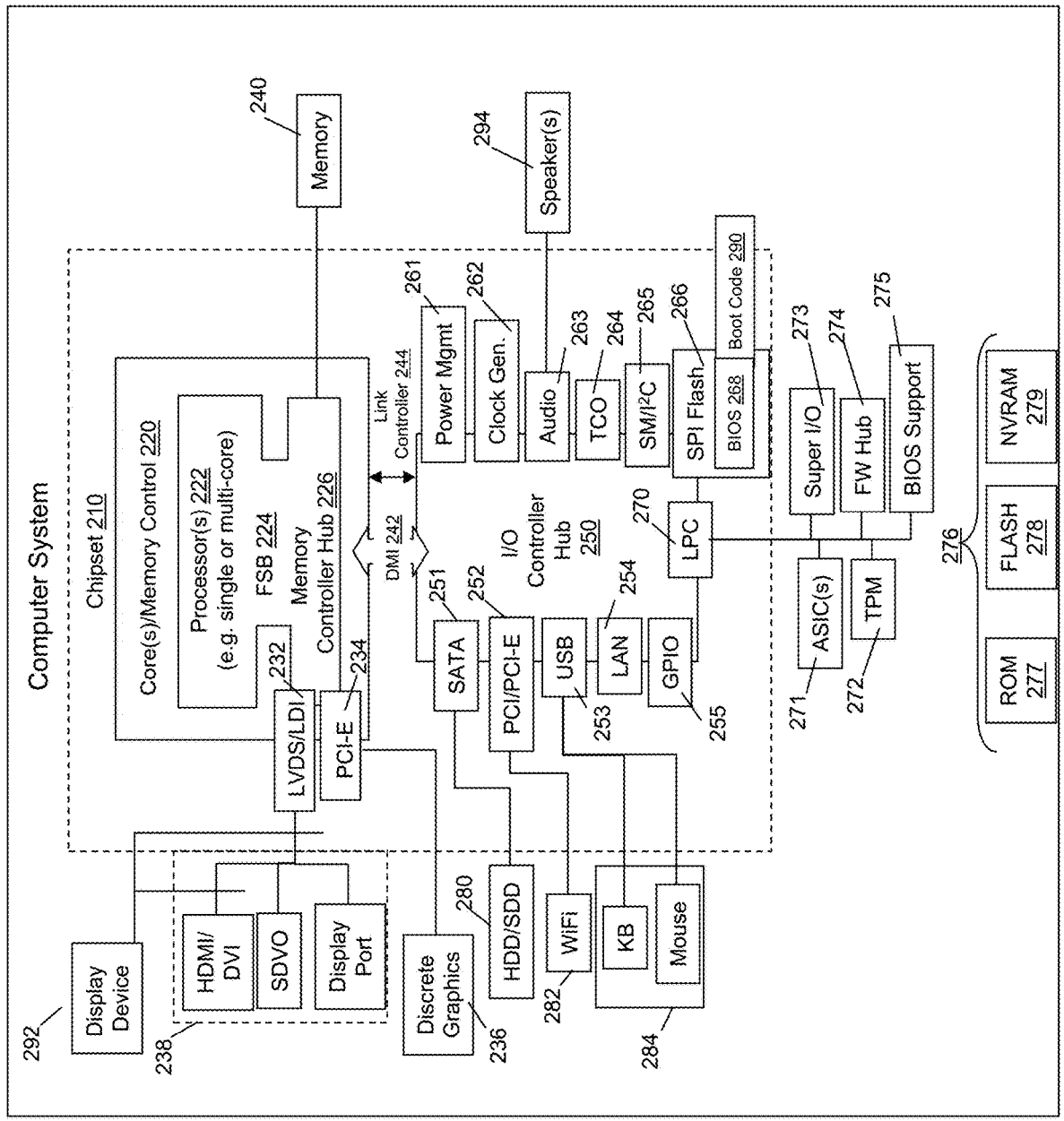
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may include cameras which users may use to take pictures. For example, the circuitry outlined in FIG. 1 may be implemented in a tablet or smart phone embodiment, whereas the circuitry outlined in FIG. 2 may be implemented in a personal computer embodiment. Alternatively, the circuitry outlined in FIG. 1 and FIG. 2 may be implemented on a hybrid information handling device.

Figure 3:
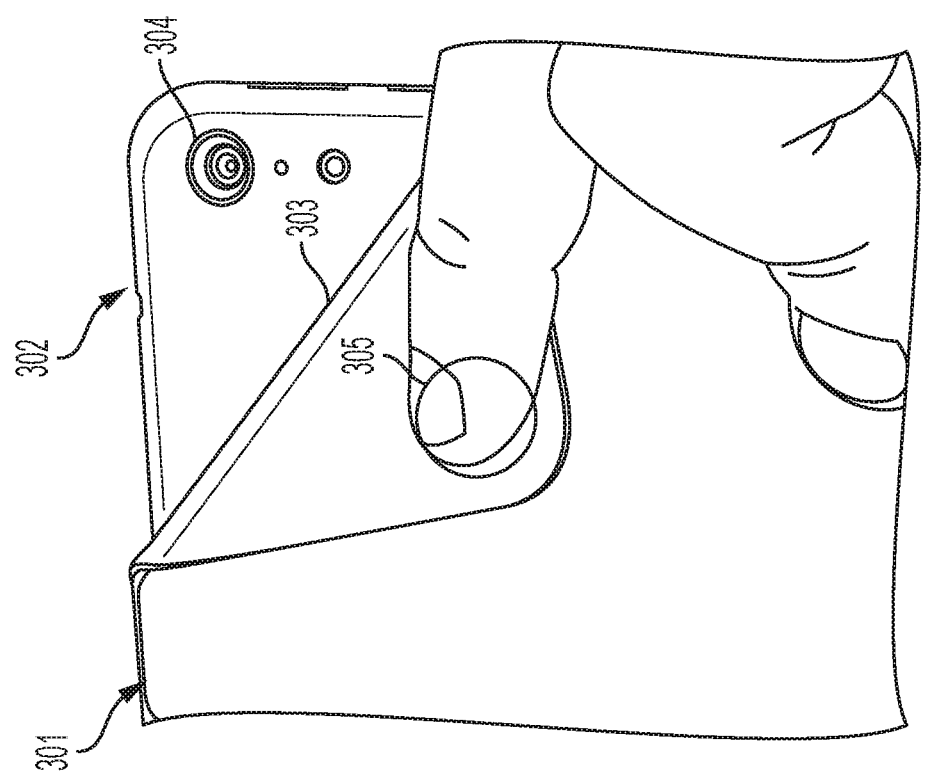
FIG. 3 illustrates an example enhanced information handling device cover.

Referring now to FIG. 3, an example enhanced cover 301 for an information handling device 302 is shown. In one embodiment, the cover 301 includes a movable area 303 that obscures and exposes a camera 304 integral to the information handling device 302. For example, the moveable area 303 may, under normal conditions, obscure the camera 304, and when the movable area 303 is operated the camera 304 may be exposed. As shown in FIG. 3, this movable area 303 may comprise a foldable flap. When operated, the user may fold the flap down exposing the camera. However, this movable area 303 may be implemented using a different method, for example, the area may include a removable area. The removable area may be attached to the rest of the cover using a connection device, for example, magnets, VELCO, mechanical connectors, or other such connection device. Other types of movable areas may be implemented, for example, a flap that folds up, areas connected by a tether, and the like. VELCRO is a registered trademark of Velcro Industries B.V. in the United States and other countries.

In one embodiment, once the movable flap 303 is operated to expose the camera 304, the camera 304 (e.g., the camera, the camera software, etc.) on the information handling device 302 may be activated. This camera activation may cause the information handling device to display the camera software including the features and functions allowing operation of the camera on the display device. In one embodiment, the user operating the movable flap 303 may automatically start a capture mode of the camera. For example, once the camera 304 is exposed, the camera may start taking pictures. As another example, once the camera 304 is exposed, the camera may start taking video.

In one embodiment, once the images (e.g., pictures, continuous feed images, etc.), have been captured the user may be prompted to perform an action, for example, save, edit, delete, share, and the like, regarding the images. For example, an embodiment may capture images, buffer the images, and then prompt the user to save the images. This automatic recording of images may be a mode which is configured by the user. For example, the user may choose to have the camera enter this automatic capturing mode upon exposure of the camera 304. Alternatively, a user may opt to not enter an automatic capturing mode. Additionally, the user may be able to configure the type of capturing mode which is started upon exposure of the camera 304. For example, the user may choose to have the automatic mode capture video, or may alternatively have the automatic mode capture pictures.

The cover 301 may additionally comprises at least one button 305 controlling the activation of the camera 304. This button 305, in one embodiment, may be integrated into the movable area 305. For example, the button may be located within the flap itself, attached to the underside of the flap, attached to the outside of the flap, and the like. In an alternative embodiment, this button 305 may be at a different location on the cover 301, for example, at the bottom, on the side, at the location where the movable area 303 folds onto the cover 301, and the like. The button 305 may be a mechanical button, capacitive sensor, or some other type of actuation device.

The activation of the camera 304 may include, in one embodiment, actuating the shutter of the camera. For example, the button 305 may act as a shutter release button, causing the camera to take a picture. In one embodiment, the activation of the camera 304 may include starting a video capture mode of the camera. For example, the button 305 may act as a start or record button, causing the camera to start capturing video. The capture mode of the camera that is activated upon actuation of the button may be configured by the user. For example, the user may set the button 305 to start a video capture mode of the camera.

In one embodiment, an actuation of the button 305 for a predetermined duration (e.g. a prolonged actuation of the button 305), may activate a capture mode of the camera 304 that is different from the capture mode activated from a press and release of the button. The different capture mode may be, for example, a video mode, high-dynamic range mode, rapid shot mode, and the like. The predetermined duration (e.g., 1 second, 3 seconds, 7 seconds, etc.) may be a default setting or may be configurable by the user. For example, a user may press and hold the button 305 causing the camera to enter a video capture mode, wherein just a short actuation would have caused the camera to enter a picture capture mode. The response of the camera upon receiving a prolonged actuation may be a default response or may be alternatively configured by the user.

In one embodiment, the cover 301 includes a communication mechanism that facilitates communication between the cover 301 and the information handling device 302. This communication mechanism may communicate with the information handling device to perform functions associated with buttons included on the cover. For example, upon actuating the button 305, signals, instructions, or the like, may be sent to the information handling device to activate the camera. This communication mechanism may be, in one embodiment, integrated into the cover in the form of a short range communication protocol (e.g., radio frequency identification, near field communication, etc.) chip or device. Alternatively or additionally, this communication mechanism may include electrical connectors that are coupled to the information handling device 302 using a connection port on the information handling device 302. For example, the cover 301 may include a universal serial bus (USB) connector that plugs into the USB connection port on the information handling device 302. As another example, the cover 301 may include a connector that plugs into the docking port connector of the information handling device 302.

In one embodiment, the cover may include additional functions or features. For example, referring to FIG. 4, the cover 401 may include a flash 406. Some information handling devices 402 may have a flash 407 that is integral to the information handling device 402. However, since these flashes 407 are generally located near the camera 404, image distortion, for example, bloom, white flash, distorted lines, and the like, may occur. The cover flash 406, may be located on the movable area 403, or may be located elsewhere in the cover 401. Upon activation of this flash, one embodiment may disable the information handling device flash 407. Additionally or alternatively, an embodiment may activate both the cover flash 406 and the information handling device flash 407 to provide more light. The activation or deactivation of either the cover flash 406 or the information handling device flash 407 may be either a default setting or configured by the user.

Figure 5:
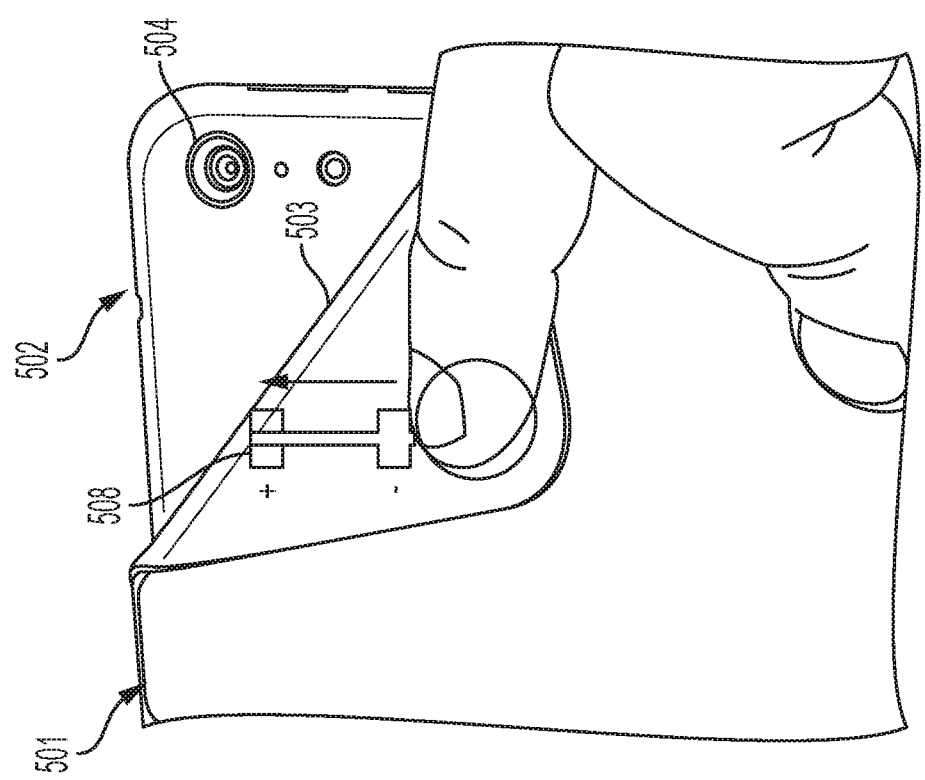
FIG. 5 illustrates an example enhanced information handling device cover with zoom control.

Referring to FIG. 5, an additional or alternative feature or function included on the cover 501 may include a zoom control 508 which may control a zoom command of the camera 504. Alternatively or additionally, referring to FIG. 6, the cover 601 may include a toggle 609 which may control the capture mode (e.g., picture capture, video capture, panoramic image capture, high-dynamic range image capture, rapid shot image capture, etc.) of the camera 604. These controls 508 and 609 may be, for example, a mechanical slider, capacitive sensor, multiple buttons, switches, and the like. The control(s) may be located on the movable area 503 and 603 or may be located in a different location of the cover 501 and 601. Upon actuating the zoom control 508, the information handling device 502 may receive a command, signal, instruction, or the like, for example through the communication mechanism, to control the zoom feature of the camera. Upon actuating the toggle 609, the information handling device 602 may receive a command, signal, instruction, or the like, changing or controlling the capture mode of the camera 604. For example, the switch may allow the user to toggle between picture capture mode and video capture mode.

Figure 4:
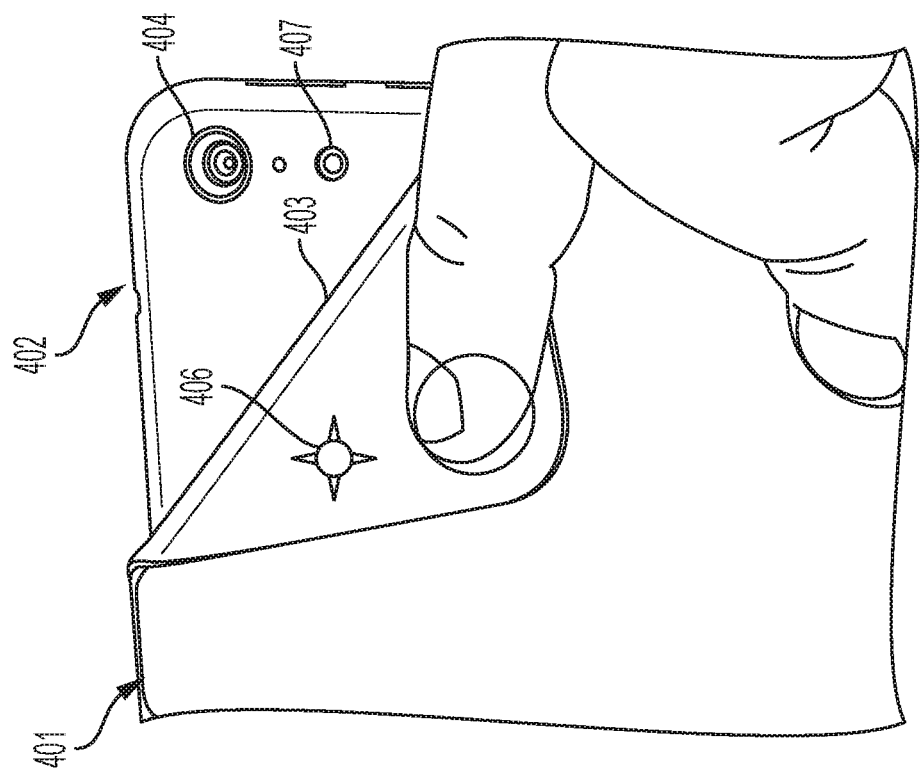
FIG. 4 illustrates an example enhanced information handling device cover with flash.
Figure 6:
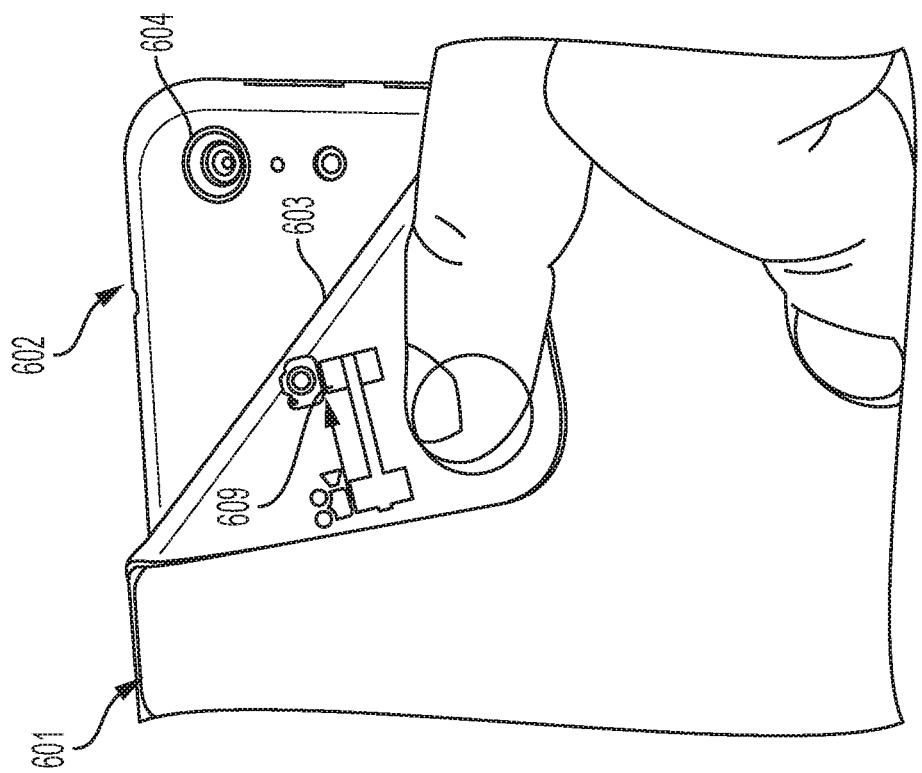
FIG. 6 illustrates an example enhanced information handling device cover with capture mode toggle.

The features and functions described with respect to FIGS. 4-6 may be used in combination in one embodiment. For example, one embodiment may include a flash, zoom control, and capture mode toggle. Alternatively, an embodiment may include just a subset of these features and functions. Other features and functions may be possible and are contemplated.

Accordingly, as illustrated by the example embodiments and figures, an embodiment provides a cover for an information handling device allowing having enhanced features and functionality. A user may be able to control the camera on an information handling device with features integrated into the cover. For example, one embodiment allows the user to activate the camera (e.g., take a picture, start a video capture mode, etc.), using a button integrated into the cover. Additional or alternative embodiments provide additional functionality, for example, a flash integrated into the cover, a zoom control, a capture mode toggle, and the like. Thus, an embodiment provides a cover with enhanced functionality decreasing the requirement that the user learn the camera software of the information handling device and allowing the user to get the fleeting once in a lifetime picture.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
an information handling device having an integral camera, wherein at least one lens of the integral camera is located on a side substantially opposite a display side of the information handling device; and
a removable cover for the information handling device, wherein the removable cover comprises a section covering at least a portion of the side having the lens, comprising:
a movable area of the section of the removable cover, the movable area comprising a corner of the section and the movable area obscuring and exposing the at least one lens of the camera and controlling activation of camera software associated with the camera upon exposure of the lens, wherein the activation of the camera software comprises displaying operating functions associated with the camera software on a display device of the information handling device;

at least one button integral to the movable area and controlling a function of at least one of: the camera and the camera software, wherein the at least one button is on a side of the movable area facing outwards with respect to the information handling device when the movable area is folded down and exposing the at least one lens; and a communication mechanism integrated into the removable cover and facilitating communication between the removable cover and the information handling device, wherein the facilitating communication comprises communicating a signal from the at least one button to the information handling device to perform the function.

2. The system of claim 1, wherein the at least one button is integrated into the movable area.

3. The system of claim 1, wherein the controlling a function of the activated camera comprises actuating the shutter of the camera.

4. The system of claim 1, wherein the controlling a function of the activated camera software comprises starting a video capture mode of the camera.

5. The system of claim 1, wherein an actuation of the at least one button for a predetermined duration activates a capture mode.

6. The system of claim 1, wherein the cover further comprises a zoom control for the camera.

7. The system of claim 6, wherein the zoom control is selected from the group consisting of: a switch, a mechanical slider, a capacitive sensor, and multiple buttons.

8. The system of claim 1, wherein the cover further comprises a toggle controlling a capture mode of the camera.

9. The system of claim 1, wherein the cover further comprises a flash.

10. The system of claim 9, wherein the information handling device comprises a second flash.

11. The system of claim 1, wherein the communication mechanism comprises a system which communicates using a short range wireless communication protocol.

12. The system of claim 1, wherein the communication mechanism comprises electrical connectors which are coupled to the information handling device using a connection port on the information handling device.

13. A method, comprising:

receiving, through a communication mechanism operatively coupled to a removable cover for an information handling device, a user input, the user input comprising exposing a lens of a camera integral to the information handling device, wherein the lens of the camera is located on a side substantially opposite a display side of the information handling device, wherein the removable cover comprises a section covering at least a portion of the side having the lens, wherein the exposing comprises the user operating a movable area of the section of the removable cover, the movable area comprising a corner of the section, and wherein the exposing activates camera software associated with the camera upon exposure of the lens, wherein the activation of the camera software comprises displaying operating functions associated with the camera software on a display device of the information handling device;

receiving a user input from at least one button integral to the movable area controlling at least one function of at least one of: the camera and the camera software, wherein the at least one button is on a side of the movable area facing outwards with respect to the information handling device when the movable area is folded down and exposing the at least one lens, wherein the received user input actuates a shutter of the camera, wherein the user input from at least one button provides a signal, communicated through the communication mechanism to the information handling device, to perform the function; and receiving, using a processor, the image captured by the camera responsive to actuation of the shutter.

14. The method of claim 13, wherein the activating the camera comprises automatically starting a capture mode of the camera.

15. The method of claim 13, wherein the activation of the camera software comprises starting a video capture mode of the camera and wherein the image comprises a continuous image feed.

16. The method of claim 13, wherein the user input comprises an actuation of the button for a predetermined duration for activating a capture mode of the camera.

17. The method of claim 13, further comprising receiving a user input actuating a zoom control for the camera.

18. The method of claim 13, further comprising receiving a user input actuating a toggle controlling the capture mode of the camera.

19. A device, comprising:

a processor;

a communication mechanism operatively coupled to the processor;

a camera operatively coupled to the processor;

a memory device that stores instructions executable by the processor to:

receive, through the communication mechanism, a user input, the user input comprising exposing a lens of the camera, wherein the lens of the camera is located on a side substantially opposite a display side of the device, wherein the user input comprises operating a movable area of a section of a removable cover on the device, the section covering at least a portion of the side having the lens, the movable area comprising a corner of the section, and wherein the exposing activates camera software associated with the camera upon exposure of the lens, wherein the activation of the camera software comprises displaying operating functions associated with the camera software on a display device of the information handling device;

receiving a user input from at least one button integral to the movable area controlling at least one function of at least one of: the camera and the camera software, wherein the received user input actuates a shutter of the camera, wherein the at least one button is on a side of the movable area facing outwards with respect to the information handling device when the movable area is folded down and exposing the at least one lens, wherein the user input from at least one button provides a signal, communicated through the communication mechanism to the information handling device, to perform the function; and receive the image captured by the camera responsive to actuation of the shutter.

20. A removable cover, comprising:

a section covering at least a portion of a side of an information handling device, the side comprising a lens of a camera of the information handling device and the side being substantially opposite a display side of the information handling device;

a movable area of the section of the removable cover, the movable area comprising a corner of the section and obscuring and exposing the lens and controlling activation of camera software associated with the camera upon exposure of the lens, wherein the activation of the camera software comprises displaying operating functions associated with the camera software on a display device of the information handling device;

at least one button integral to the movable area and controlling a function of at least one of: the camera of the information handling device and the camera software, wherein the at least one button is on a side of the movable area facing outwards with respect to the information handling device when the movable area is folded down and exposing the at least one lens; and a communication mechanism integrated into the removable cover and facilitating communication between the removable cover and the information handling device, wherein the facilitating communication comprises communicating a signal from the at least one button to the information handling device to perform the function.

\* \* \* \* \*